US007990318B2

(12) United States Patent
Sato

(10) Patent No.: US 7,990,318 B2
(45) Date of Patent: Aug. 2, 2011

(54) RADIO-FREQUENCY TELEPHONE SET

(75) Inventor: Katsuhiro Sato, Kani (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1029 days.

(21) Appl. No.: 11/882,903

(22) Filed: Aug. 7, 2007

(65) Prior Publication Data

US 2008/0234008 A1 Sep. 25, 2008

(30) Foreign Application Priority Data

Mar. 22, 2007 (JP) ................................ 2007-074280

(51) Int. Cl.
*H04M 1/00* (2006.01)

(52) U.S. Cl. ................................ 343/700 MS; 343/702

(58) Field of Classification Search .................. 343/702, 343/700 MS

See application file for complete search history.

(56) References Cited

U.S. PATENT DOCUMENTS

| | | | | |
|---|---|---|---|---|
| 4,908,940 | A * | 3/1990 | Amano et al. | 29/852 |
| 5,537,123 | A | 7/1996 | Mandai et al. | |
| 6,184,833 | B1 * | 2/2001 | Tran | 343/700 MS |
| 6,628,230 | B2 * | 9/2003 | Mikami et al. | 342/175 |
| 6,674,347 | B1 * | 1/2004 | Maruhashi et al. | 333/238 |
| 6,700,792 | B1 * | 3/2004 | Bando et al. | 361/761 |
| 2001/0040527 | A1 * | 11/2001 | Nagumo et al. | 343/700 MS |
| 2004/0189531 | A1 * | 9/2004 | Dohata | 343/700 MS |
| 2008/0165064 | A1 * | 7/2008 | Hill et al. | 343/702 |

FOREIGN PATENT DOCUMENTS

| | | |
|---|---|---|
| JP | U-58-158506 | 10/1983 |
| JP | U-3-97975 | 10/1991 |
| JP | A-07-249925 | 9/1995 |
| JP | A-10-334203 | 12/1998 |
| JP | A-2003-298195 | 10/2003 |
| JP | A-2005-204244 | 7/2005 |
| WO | WO 2007/049382 A1 | 5/2007 |

* cited by examiner

*Primary Examiner* — Jacob Y. Choi
*Assistant Examiner* — Darleen J Stockley
(74) *Attorney, Agent, or Firm* — Oliff & Berridge, PLC

(57) ABSTRACT

A radio-frequency telephone set including (a) a powered antenna element having a power supply portion, and (b) a substrate having a dielectric layer, a first conductive layer formed on one of opposite surfaces of the dielectric layer, and a second conductive layer formed on the other of said opposite surfaces, wherein the first conductive layer includes a conductive pattern having opposite end portions one of which is electrically connected to the power supply portion, and further having a land electrode electrically connected to the other end portion, and the second conductive layer includes a ground electrode and a conductor-free portion defined by said ground electrode, the land electrode and the conductor-free portion at least partially overlapping each other as viewed in a direction perpendicular to the plane of the dielectric layer.

18 Claims, 11 Drawing Sheets

RADIO-FREQUENCY TELEPHONE SET

CROSS REFERENCE TO RELATED APPLICATION

The present application claims the priority from Japanese Patent Application No. 2007-074280 filed Mar. 22, 2007, the disclosure of which is herein incorporated by reference in its entirety.

BACKGROUND OF THE INVENTION

1. Field of the Invention

The present invention relates to a radio-frequency telephone set configured to transmit and receive a radio wave in a GHz band.

2. Description of Related Art

There have been proposed various types of a radio-frequency telephone set configured to transmit and receive a radio wave in a GHz band. JP-2005-204244 A discloses in paragraphs [0037]-[0052] an example of such a radio-frequency telephone set having an antenna device wherein an assembly component is constituted by a dielectric body in the form of a relatively long quadrangular prism, and a λ/4 non-powered antenna element and a λ/4 exciter which are bonded to the dielectric body. A power supply terminal of the λ/4 exciter is electrically connected to a core conductor of a coaxial cable, while one end of the λ/4 non-powered antenna element is electrically connected to an outer conductor of the coaxial cable.

Although the radio-frequency telephone set disclosed in the above-identified publication is advantageous for a broad frequency band of the radio wave owing to two resonance frequencies, this radio-frequency telephone set requires formation of the λ/4 non-powered antenna element and the λ/4 exciter, and the antenna device tends to be large-sized. Accordingly, it is difficult to reduce the size of the radio-frequency telephone set.

SUMMARY OF THE INVENTION

The present invention was made in view of the background art described above. It is therefore an object of the present invention to provide a radio-frequency telephone set which is small-sized with a reduced size of the antenna device, and which permits a broad frequency band of the radio wave to be transmitted and received.

The object indicated above can be achieved according to the principle of the present invention, which provides a radio-frequency telephone set comprising (a) a powered antenna element having a power supply portion, and (b) a substrate having a dielectric layer, a first conductive layer formed on one of opposite surfaces of the dielectric layer, and a second conductive layer formed on the other of the opposite surfaces, wherein the first conductive layer includes a conductive pattern that has opposite end portions one of which is electrically connected to the power supply portion, and further has a land electrode electrically connected to the other of the opposite end portions, and wherein the second conductive layer includes a ground electrode and a conductor-free portion defined by said ground electrode, the land electrode and the conductor-free portion at least partially overlapping each other as viewed in a direction perpendicular to a plane of said dielectric layer.

In the radio-frequency telephone set of the present invention constructed as described above, the land electrode formed at one end portion of the conductive pattern and the conductor-free portion of the second conductor at least partially overlap each other as viewed in the direction perpendicular to the plane of the dielectric layer, so that the land electrode and the conductor-free portion define therebetween an electrostatic capacitor, and the power supply portion of the powered antenna element is electrically coupled with the ground electrode via the electrostatic capacitor, whereby a radio wave to be transmitted from and received by the radio-frequency telephone set is given two resonance points, making it possible to broaden the frequency band of the radio wave. In addition, an antenna device can be constituted by only the powered antenna element, so that the radio-frequency telephone set can be small-sized.

BRIEF DESCRIPTION OF THE DRAWINGS

The above and other objects, features, advantages and technical and industrial significance of the present invention will be better understood by reading the following detailed description of preferred embodiments of the present invention, when considered in connection with the accompanying drawings, in which.

DETAILED DESCRIPTION OF THE PREFERRED EMBODIMENTS

Figure 1:
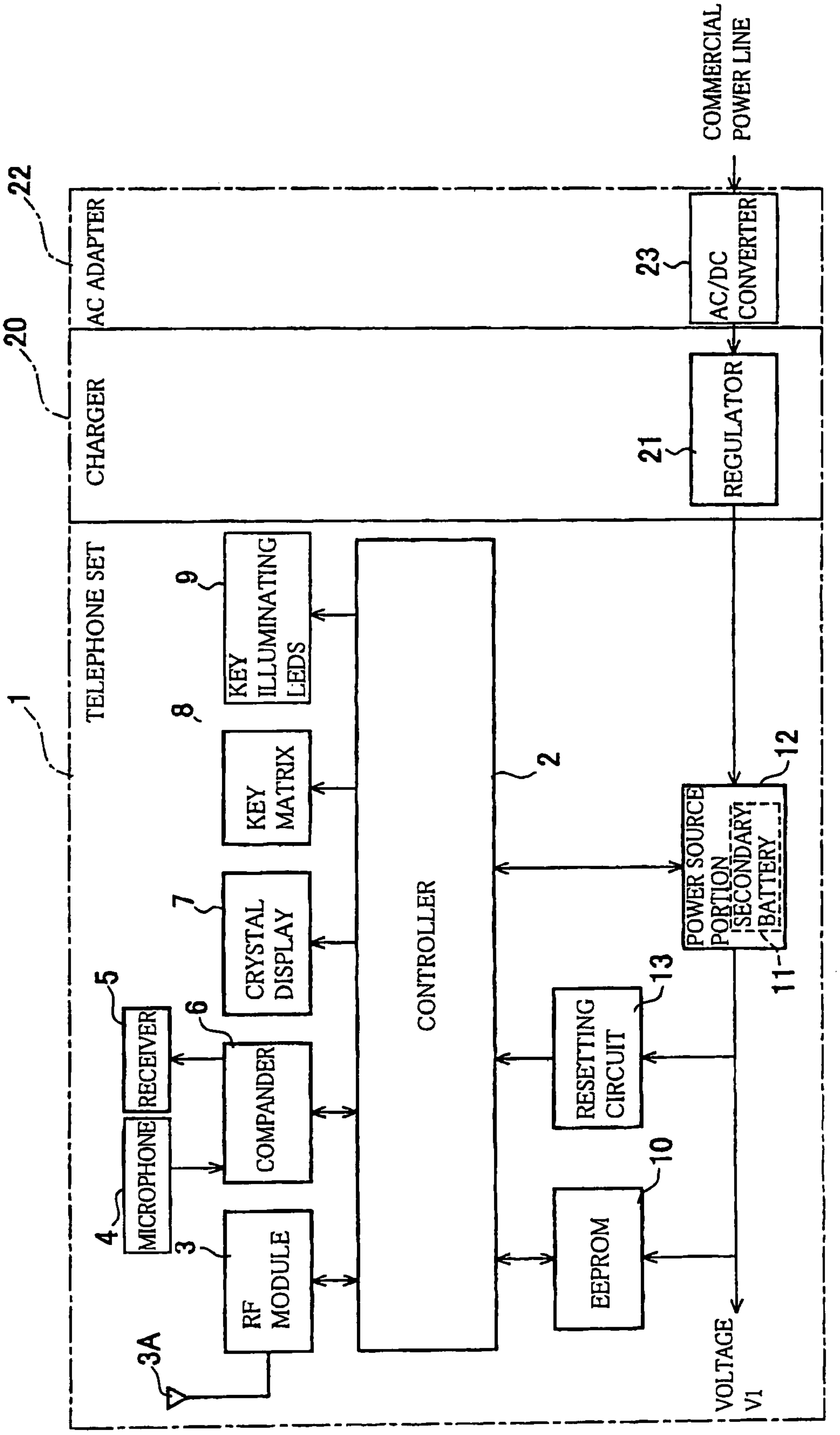
FIG. 1 is a block diagram illustrating an arrangement of a radio-frequency telephone set constructed according to a first embodiment of this invention.

Referring to the drawings, there will be described in detail the preferred embodiments of a radio-frequency telephone set of this invention in the form of a wireless or remote telephone set to be provided for a multiple-function machine capable of functioning as a scanner, a printer, a telecopier and a telephone set, for example. This telephone set may be referred to as a "child telephone set" as distinguished from a "parent telephone set".

Reference is first made to the block diagram of FIG. 1 schematically showing a radio-frequency telephone set 1 constructed according to the first embodiment of the present invention. As shown in FIG. 1, the radio-frequency telephone set 1 include: a controller 2 configured to control various devices of the telephone set 1; an RF module 3 configured to transmit and receive a radio wave through a planar antenna device 3A; a microphone 4 operable to convert a voice generated externally of the telephone set 1, into a voice signal; a receiver 5 operable to convert the voice signal into a voice to be heard externally of the telephone set 1; and a compander 6 configured to compress and expand a dynamic range of an input signal. The planar antenna device 3A includes a planar top wall portion 3A1 and a pair of side wall portions 3A2 extending from the opposite ends of the planar top wall portion in a direction perpendicular to the planar top wall portion 3A1.

The telephone set 1 further includes: a liquid crystal display 7 operable to display an image; a key matrix 8 including various keys manually operable to manipulate the telephone set 1; key illuminating LEDs operable to illuminate the selected ones of the keys of the key matrix 8; and an EEPROM 10 which is a non-volatile memory capable of rewriting stored data.

The telephone set 1 further includes a power source portion 12 incorporating a secondary battery 11 which is provided to supply power to the various devices of the telephone set 1. The power source portion 12 is arranged to apply a predetermined constant voltage V1 (about 3.3V, for example) to the various devices such as the controller 2 and the EEPROM 10. The telephone set 1 further includes a resetting circuit 13 arranged to reset the controller 2 according to the output voltage V1 of the power source portion 12.

The controller 2 incorporates a ROM (read-only memory) storing various control programs for executing various control routines, a RAM (random-access memory) used to temporarily store data during execution of the control routines, an input/output interface connecting the controller 2 and the various devices, and timers for measuring various times.

The RF module 3 is configured to set the frequency of the radio wave to be transmitted, and the frequency of the radio wave to be received, on the basis of frequency setting data received from the controller 2. The RF module 3 is further configured to superimpose an input signal received from the compander 6, on the radio wave, and to transmit the radio wave through the planar antenna device 3A. The RF module 3 is also configured to extract a signal (voice signal or data signal) superimposed on the radio wave received through the planar antenna device 3A, and to apply the extracted signal to the compander 6. The RF module 3 is further configured to provide the controller 2 with a wave-strength signal (RSSI signal) indicative of the strength or intensity of the received radio wave, and a carrier sensing signal indicative of the reception of the radio wave from the "parent telephone set".

The compander 6 is configured to compress the dynamic range of the voice signal received through the microphone 4 according to a control signal received from the controller 2, and to apply the compressed voice signal to the RF module 3. The compander 6 is further configured to expand the dynamic range of the voice signal received from the RF module 3, and apply the expanded voice signal to the receiver 5, or to apply the dynamic range of the data signal received from the RF module 3 to the controller 2.

When each key of the key matrix 8 is pressed, a key signal indicative of the pressed key is applied to the controller 2. The key illuminating LEDs 9 are arranged to illuminate selected ones of the keys of the key matrix 8. For example, the keys selected to be illuminated by the key illuminating LEDs 9 include a key to be pressed for connecting the telephone set 1 to an external telephone line, a key to be pressed for connecting the telephone set 1 to an internal or in-house telephone line, a hang-up key to be pressed to cut off the connection of the telephone set 1 to the external or internal telephone line, and various function keys provided to set various functions of the telephone set 1.

The EEPROM 10 is provided to store various set values of the telephone set 1, to apply the set values to the controller 2, and to change the set values. The secondary battery 11 of the power source portion 12 is removably installed on the telephone set 1. When the telephone set 1 is placed on a charger 20, the secondary battery 11 is charged with an electric energy of a predetermined voltage (about DC7-8V, for example) supplied from an eternal commercial power line (of about AC100V, for example) through an AC/DC converter 23 of an AC adapter 22 and a regulator 21 of the charger 20.

The resetting circuit 13 is arranged to detect the output voltage V1 of the power source portion 12, and to apply a resetting signal to the controller 2 to reset the controller 2, when the detected output voltage V1 falls below a lower limit $V_{low}$ (about DC3.0V, for example) below which the controller 2 is not able to normally function.

Figure 2:
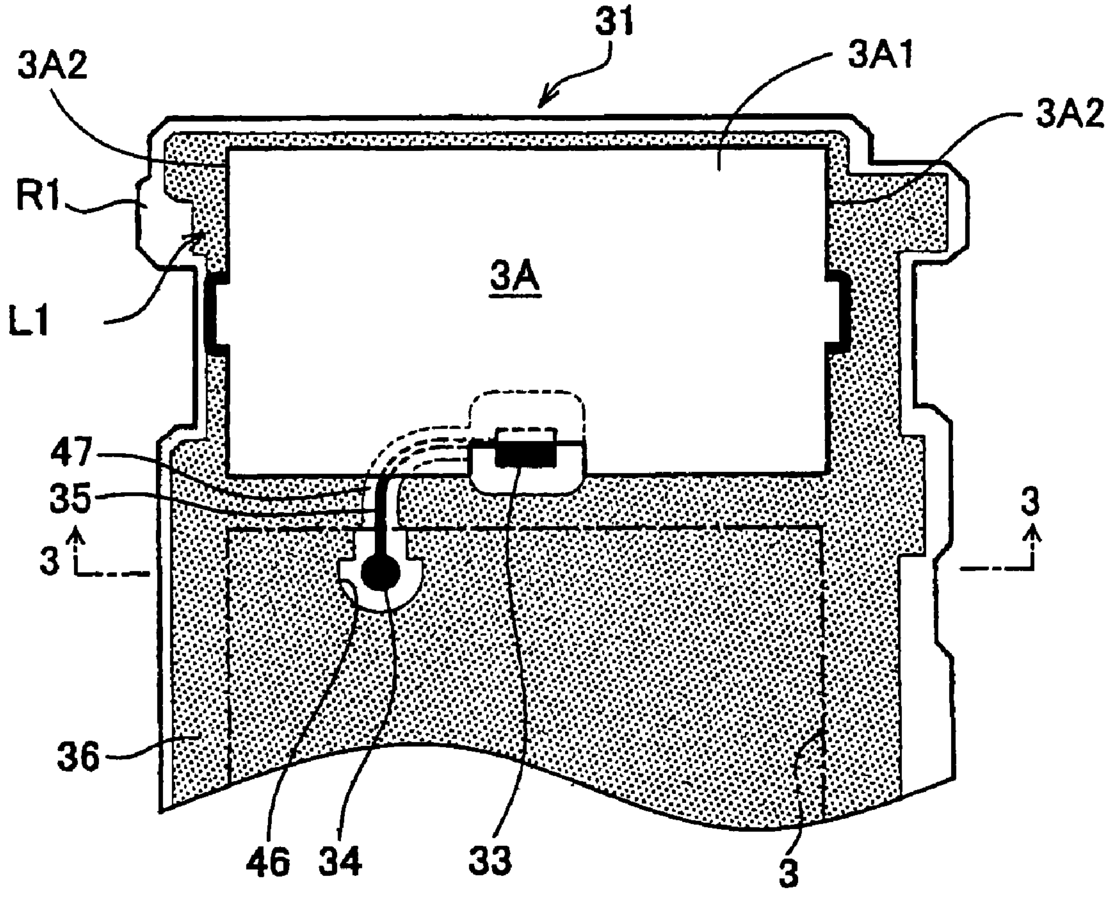
FIG. 2 is a fragmentary enlarged plan view of a multi-layered substrate on which a planar antenna device and an RF module are formed.
Figure 3:
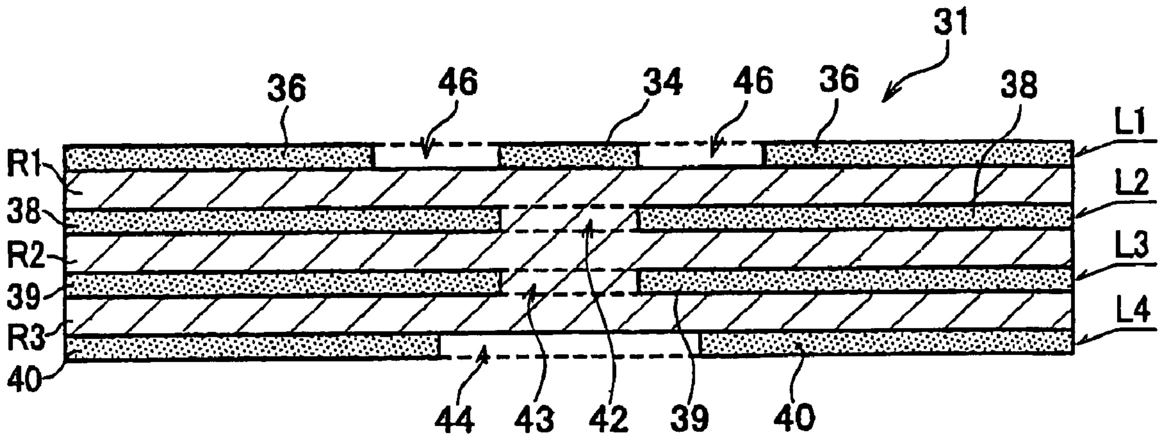
FIG. 3 is a cross sectional view taken along line 3-3 of FIG. 2.
Figure 4A:
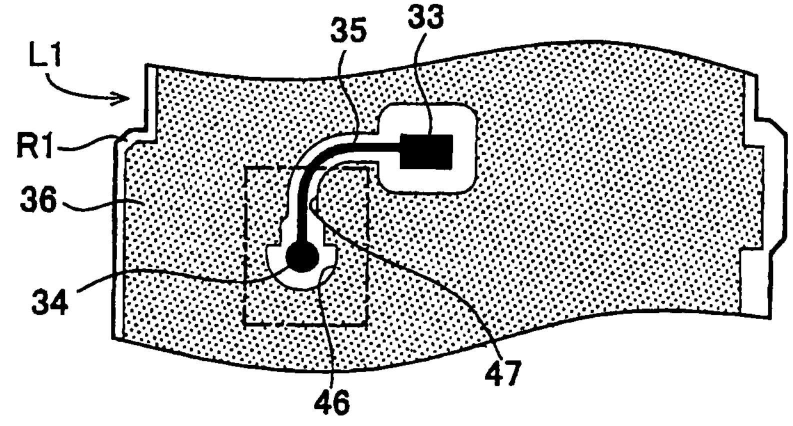
FIGS. 4A-4D are fragmentary views showing portions of conductive layers of the multi-layered substrate, in which a land electrode is formed or which are aligned with the land electrode as viewed in a direction perpendicular to the plane of the substrate.
Figure 4B:
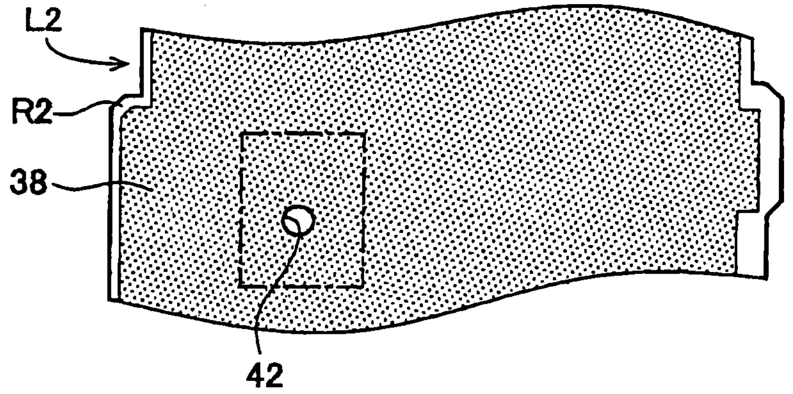
Figure 4C:
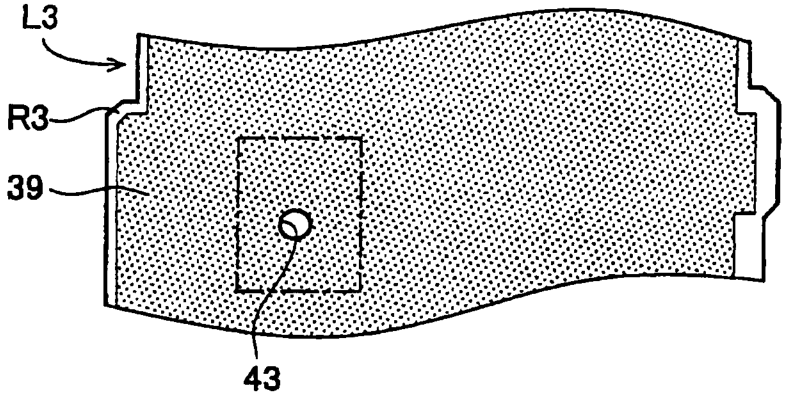
Figure 4D:
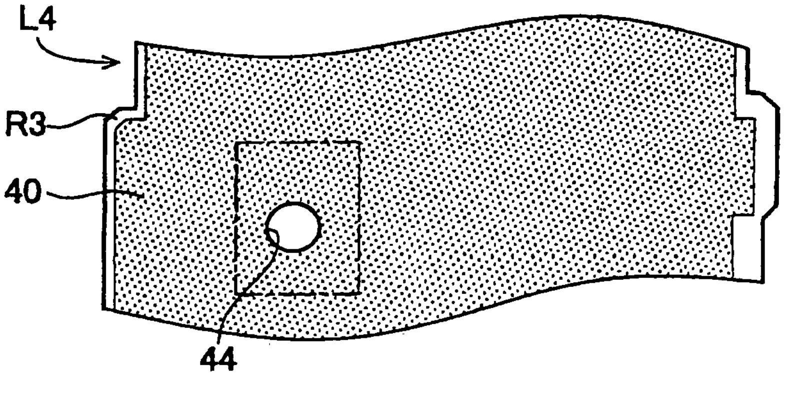

Referring next to FIGS. 2-4, there will be described an arrangement of a multi-layered substrate 31 on which there are mounted a powered antenna element in the form of the planar antenna device 3A and a high-frequency circuit in the form of the RF module 3.

As shown in FIGS. 2 and 3, the multi-layered substrate 31 consists of four electrically conductive layers L1-L4 and three dielectric layers R1-R3 which are alternately arranged such that each dielectric layer is sandwiched between the adjacent two conductive layers. The dielectric layers R1-R3 are formed of a glass epoxy resin. The exposed first conductive layer L1 includes a conductive pattern having a power supply electrode 33, a circular land electrode 34 and a strip line 35 connecting the power supply electrode 33 and the land electrode 34. The planar antenna device 3A having an inverted-U shape as described above has a supply power portion soldered to the power supply electrode 33, and the RF module 3 has an input and output terminal soldered to the land electrode 34. In other words, the conductive pattern has opposite end portions one of which is electrically connected to the power supply electrode 33, and further has the land electrode 34 electrically connected to the other end portion.

The first conductive layer L1 further includes a ground electrode 36 electrically insulated from the land electrode 34 and the strip line 35. The ground electrode 36 is coated with a solder resist ink. The ground electrode 36 cooperates with the land electrode 34 to define therebetween a semicircular conductor-free portion 46, and further cooperates with the strip line to define therebetween a conductor-free portion 47. The planar antenna device 3A is soldered at the lower ends of the side wall portions 3A2 to the ground electrode 36, and is thereby fixed to the multi-layered substrate 31 at the central parts of the side wall portions 3A2 (as viewed in the direction parallel to the side wall portions 3A2).

As shown in FIGS. 3 and 4, the second, third and fourth conductive layers L2, L3 and L4 include respective ground electrodes 38, 39 and 40 which are partially opposed to the ground electrode 36 of the first conductive layer L1 as viewed in the direction perpendicular to the conductive layers L1-L4 (dielectric layers R1-R3). The second conductive layer L2 has a circular conductive-free portion 42 which is defined by the ground electrode 38 and which is aligned with the land electrode 34 of the first conductive layer L1 as viewed in the direction of thickness of the second conductive layer L2. The circular conductor-free portion 42 has an inside diameter equal to an outside diameter of the land electrode 34. Thus, an entirety of the circular land electrode 34 and an entirety of the circular conductor-free portion 42 overlap each other as viewed in the direction of thickness of the dielectric layer R1, that is, in the direction perpendicular to the plane of the dielectric layer R1.

Similarly, the third conductive layer L3 has a circular conductor-free portion 43 which is defined by the ground electrode 39 and which is aligned with the land electrode 34 as viewed in the direction of thickness of the third conductive layer L3. The circular conductor-free portion 43 has an inside diameter equal to the outside diameter of the land electrode 34. Thus, the entirety of the circular land electrode 34 and the entirety of the circular conductor-free portion 43 overlap each other as viewed in the direction perpendicular to the plane of the dielectric layer R1.

The fourth conductive layer L4 has a circular conductor-free portion 44 which is defined by the ground electrode 40 and which is aligned with the land electrode 34 as viewed in the direction of thickness of the fourth conductive layer L4. The circular conductor-free portion 44 has an inside diameter larger than the outside diameter of the land electrode 34. Thus, the circular land electrode 34 and the circular conductor-free portion 44 partially overlap each other as viewed in the direction of thickness of the fourth conductive layer L4 such that the land electrode 34 is located within the conductor-free portion 44 as viewed in the direction perpendicular to the plane of the dielectric layer R1, that is, the entirety of the land electrode 34 overlaps the conductor-free portion 44.

The conductor-free portions 46, 47 of the first conductive layer L1 are sized such that the ground electrode 36 is spaced from the land electrode 34 and the strip line 35 by a distance of not smaller than 70% of the outside diameter of the land electrode 34. In the presence of the thus sized conductor-free portions 46, 47, the ground electrode 36 does not influence the electrostatic capacity formed between the land electrode 34 and the conductor-free portion 42.

It is noted that the conductor-free portion 43 has an inside diameter larger than the outside diameter of the land electrode 34. In this case, the electrostatic capacity between the land electrode 34 and the peripheral part of the conductor-free portion 43 can be reduced and stabilized.

Figure 5:
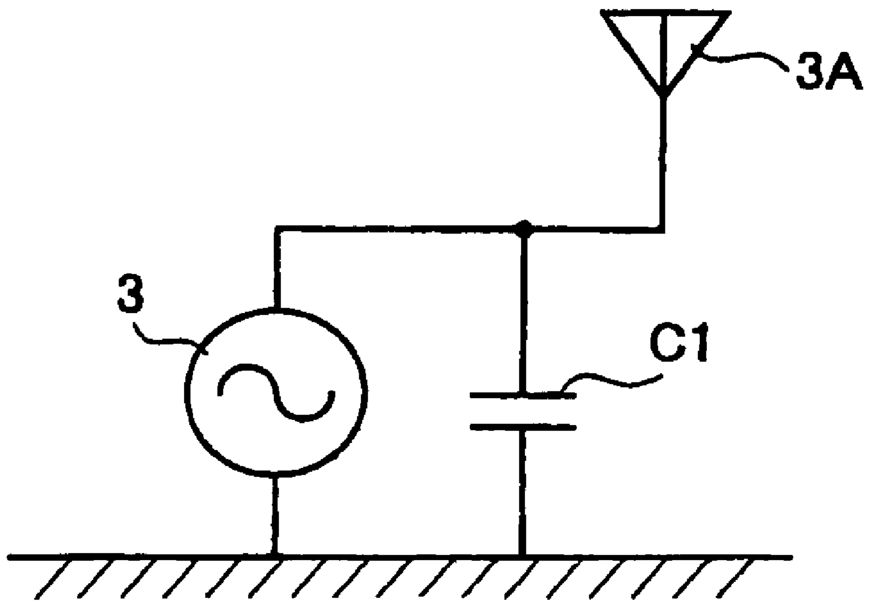
FIG. 5 is a view showing an equivalent circuit formed by the planar antenna device, RF module and multi-layered substrate.

Referring to FIG. 5, there will be described an equivalent circuit formed by the planar antenna device 3A, RF module 3 and multi-layered substrate 31.

As shown in FIG. 5, the RF module 3 is grounded, and has an input and output terminal connected to the planar antenna device 3A. The input and output terminal of the RF module 3 is also grounded through a capacitor C1 which corresponds to the electrostatic capacity formed between the land electrode 34 and the conductor-free portion 42 which are spaced apart from each other by the thickness of the dielectric layer R1 in the direction of thickness (direction perpendicular to the plane) of the dielectric layer R1. In this equivalent circuit, the radio wave to be transmitted and received through the planar antenna device 3A is given not only a primary resonance point inherent to the planar antenna device 3A, but also a secondary resonance point owing to the capacitor C1, so that the frequency band of the radio wave can be broadened.

Figure 6:
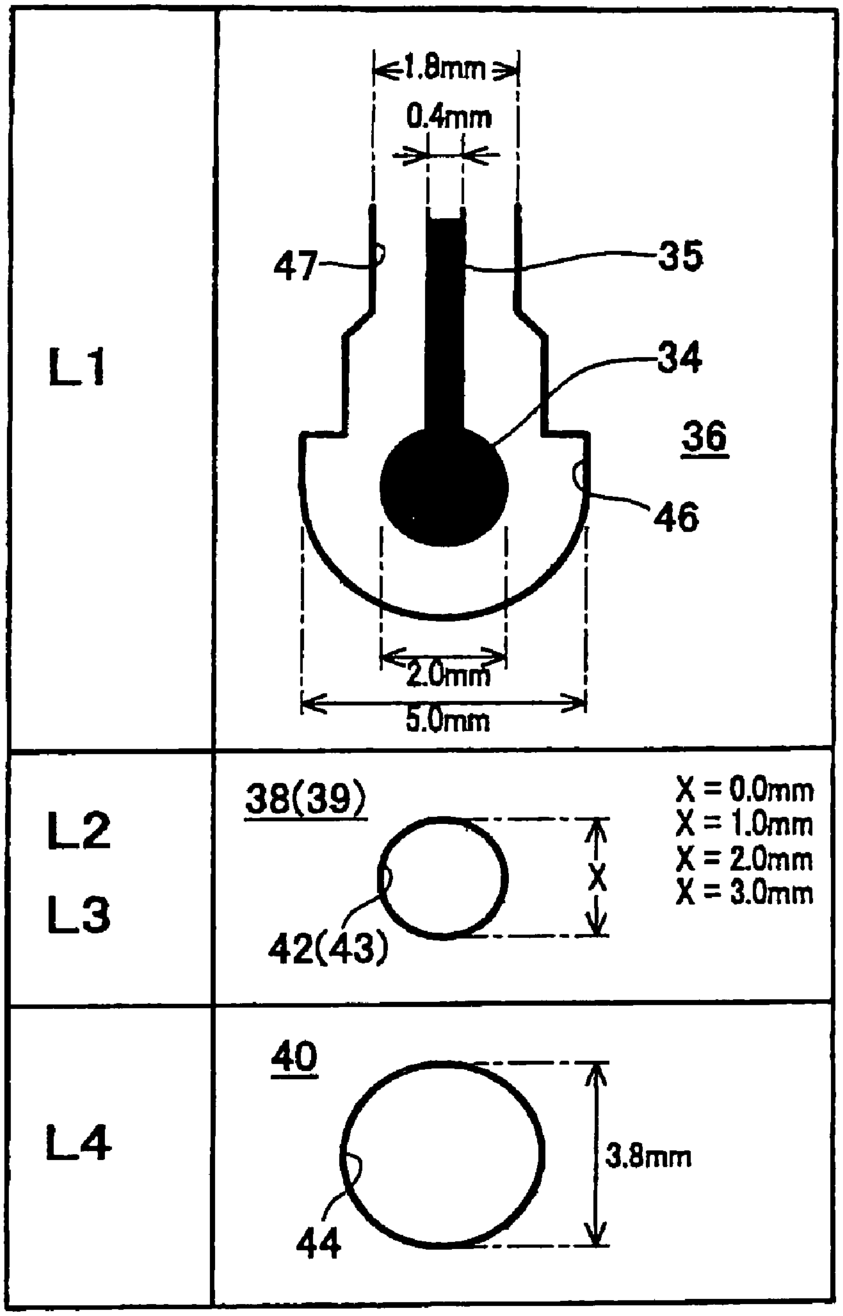
FIG. 6 is a view indicating examples of sizes of the land electrode, a strip line, and conductor-free portions of the conductive layers.
Figure 7:
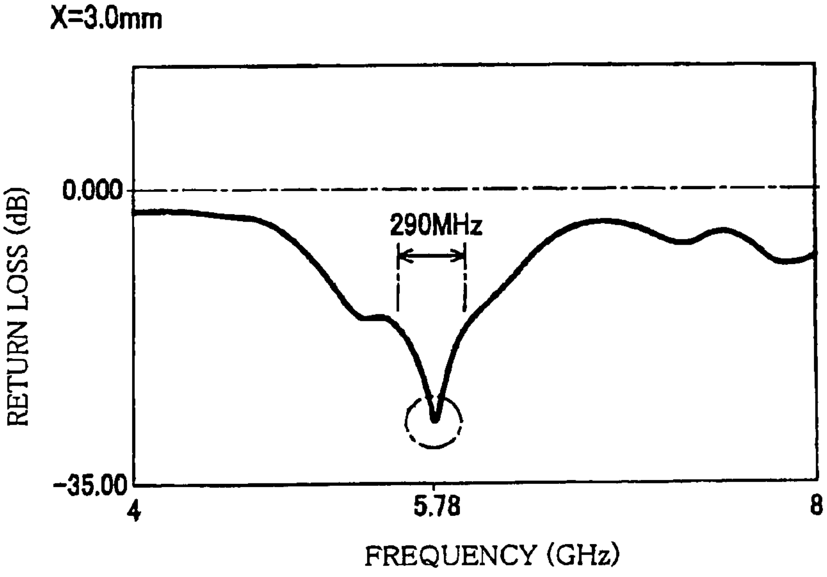
FIG. 7 is a view indicating a resonance characteristic of the planar antenna device where the conductor-free portion formed in the conductive layer L2 has a diameter X of 3.0 mm.
Figure 8:
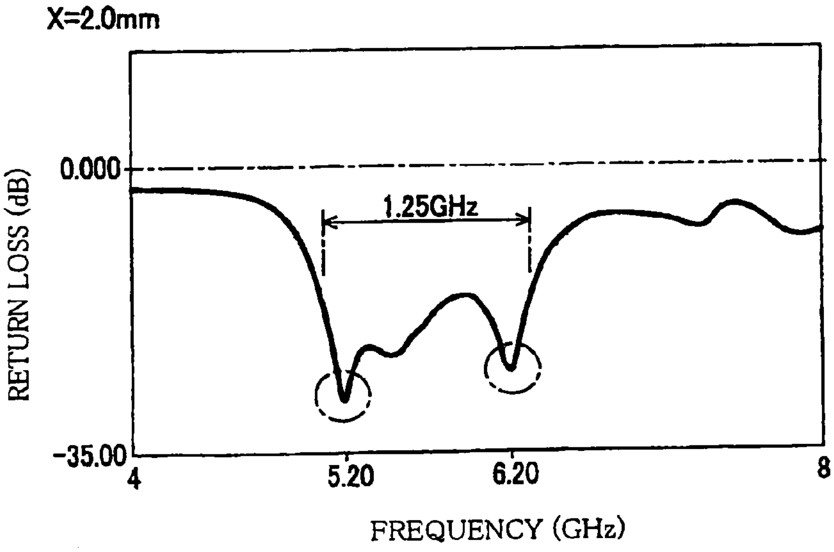
FIG. 8 is a view indicating a resonance characteristic of the planar antenna device where the conductive-free portion of the conductive layer L2 has a diameter X of 2.0 mm.
Figure 9:
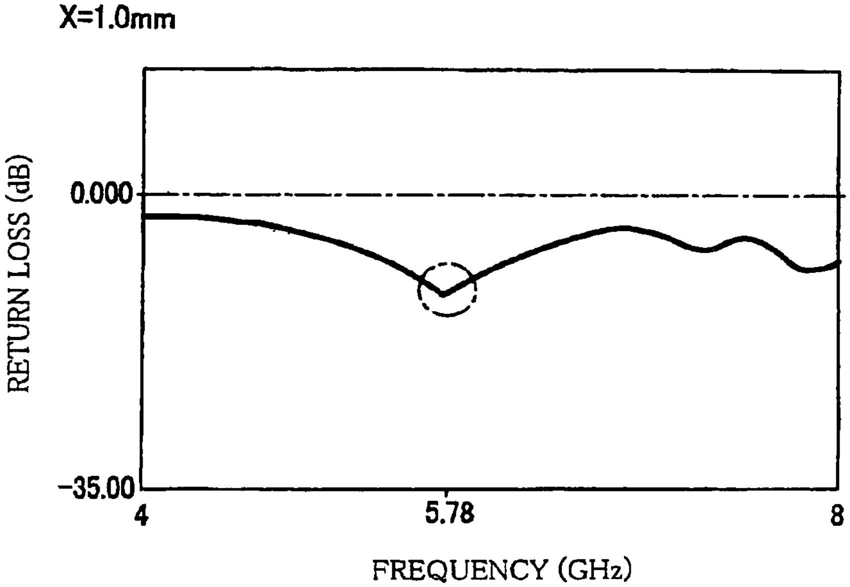
FIG. 9 is a view indicating a resonance characteristic of the planar antenna device where the conductive-free portion of the conductive layer L2 has a diameter X of 1.0 mm.
Figure 10:
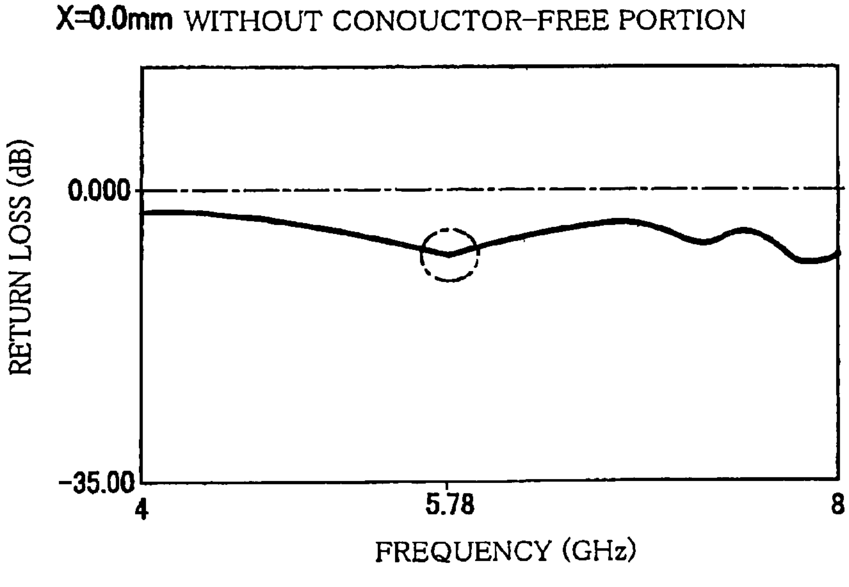
FIG. 10 is a view indicating a resonance characteristic of the planar antenna device where the conductive-free portion of the conductive layer L2 has a diameter X of 0.0 mm, namely, where the conductive-free portion is not formed in the conductive layer L2.

There will next be described in detail the planar antenna device 3A, RF module 3 and multi-layered substrate 31, by reference to FIGS. 6-10. FIG. 6 indicates examples of sizes of the land electrode 34, strip line 35, and conductor-free portions 42-44 of the conductive layers L2-L4. FIG. 7 indicates a resonance characteristic of the planar antenna device 3A where a diameter X of the conductor-free portion 42 formed in the conductive layer L2 is 3.0 mm, and FIG. 8 indicates a resonance characteristic of the planar antenna device 3A where the diameter X of the conductive-free portion 42 is 2.0 mm. FIG. 9 indicates a resonance characteristic of the planar antenna device 3A where the diameter X of the conductive-free portion 42 is 1.0 mm, and FIG. 10 indicates a resonance characteristic of the planar antenna device 3A where the diameter X of the conductive-free portion 42 is 0.0 mm, namely, where the conductive-free portion 42 is not formed in the second conductive layer L2.

In the present embodiment, the planar antenna device 3A has a resonance frequency of about 5.8 GHz, and the multi-layered substrate 31 has a total thickness of about 1 mm. Further, the first conductive layer L1 has a thickness of about 18 μm, and the second and third conductive layers L2, L3 have a thickness of about 35 μm, while the fourth conductive layer L4 has a thickness of about 18 μm. The first and third dielectric layers R1, R3 have a thickness of about 0.2 mm, and the second dielectric layer R2 has a thickness of about 0.4 mm.

As indicated in FIG. 6, the circular land electrode 34 has a diameter of 2.0 mm, and the strip line 34 has a width of 0.4 mm. The semicircular conductor-free portion 46 formed around the circular land electrode 34 has a diameter of about 5.0 mm, and the conductor-free portion 47 formed on the opposite sides of the strip line 35 has a minimum width of 1.8 mm. There were prepared four specimens of the multi-layered substrate 31 having the same specifications, except for the diameter X of the conductor-free portions 42, 43 of the second and third conductive layers L2, L3. Namely, the diameter values X of these four specimens are 0.0 mm, 1.0 mm, 2.0 mm and 3.0 mm. The multi-layered substrate wherein the diameter value X is 0.00 mm does not have the conductor-free portions 42, 43.

Resonance characteristics of the four specimens wherein the diameter X is 0.0 mm, 1.0 mm, 2.0 mm and 3.0 mm were measured by a network analyzer.

In the specimen wherein the conductor-free portions 42, 43 formed in the second and third layers L2, L3 have the diameter X of 3.0 mm, only a primary resonance point was obtained at the resonance frequency of 5.78 GHz of the planar antenna device 3A, and the frequency band width was about 290 MHz, as indicated in FIG. 7. In the specimen wherein the conductor-free portions 42, 43 have the diameter X of 2.0 mm, a primary resonance point was obtained at 5.20 GHz, and a second resonance point was obtained at 6.20 GHz, while the frequency band width was about 1.25 GHz, as indicated in FIG. 8.

In the specimen wherein the conductor-free portions 42, 43 have the diameter X of 1.0 mm, only a primary resonance point was obtained at 5.78 GHz of the planar antenna device 3A, and the frequency band width was almost zero, as indicated in FIG. 9. In the specimen wherein the conductor-free portions 42, 43 have the diameter X of 0.0 mm, that is, are not formed in the second and third layers L2, L3, only a primary resonance point was obtained at the resonance frequency of 5.78 GHz, and the frequency band width was almost zero.

Thus, the analysis shows that the provision of the powered planar antenna element in the form of the planar antenna device 3A in the specimen wherein the diameter X of the conductor-free portion 42 formed in the second conductive layer L2 is 2.0 mm permits both the primary resonance point and the secondary resonance point to be obtained respectively at 5.20 HGz and 6.20 GHz, making it possible to obtain a relatively broad frequency band width of about 1.25 GHz.

In the multi-layered substrate 31 of the radio-frequency telephone set 1 constructed according to the present first embodiment of the invention described above, the land electrode 34 to which the input and output terminal of the RF module 3 is soldered, and the conductor-free portion 42 defined by the ground electrode 38 of the second layer L2 have the same diameter and entirely overlap each other as viewed in the direction perpendicular to the dielectric layer R1 on which the land electrode 34 and the ground electrode 38 are formed. Accordingly, the electrostatic capacitor C1 is provided between the land electrode 34 and the ground electrode 38, and the power supply portion of the planar antenna device 3A is coupled to the ground electrode 38 via the electrostatic capacitor C1, so that the radio wave to be transmitted and received through the planar antenna device 3A is given the two resonance points (primary resonance point at 5.20 GHz, and secondary resonance point at 6.20 HGz, for example), making it possible to broaden the frequency band, and reduce the required size of the radio-frequency telephone set 1 owing to the use of the relatively thin planar antenna device 3A.

Further, the entirety of the land electrode 34 overlaps the entirety of the conductor-free portion 42 as viewed in the direction perpendicular to the plane of the dielectric layer R1, so that the electrostatic capacity formed between the land electrode 34 and the conductor-free portion 42 can be stabilized, whereby the frequency band of the radio wave to be transmitted and received through the planar antenna device 3A can be further broadened and stabilized.

The present embodiment is further arranged such that the second conductive layer L2 of the multi-layered substrate 31 includes the conductor-free portion 42 which is defined by the ground electrode 38 and which is aligned with the land electrode 34 formed in the first conductive layer L1 as viewed in the direction perpendicular to the first dielectric layer R1 on which the land electrode 34 and the ground electrode 38 are formed. Accordingly, a variation of the electrostatic capacity formed between the land electrode 34 and the conductor-free portion 42 can be minimized, making it possible to improve the quality of the telephone set 1 (multi-layered substrate 31), and reduce the cost of manufacture of the telephone set 1 (multi-layered substrate 31).

The present embodiment is further arranged such that the input and output terminal of the RF module 3 is soldered to the land electrode 34, so as to minimize discontinuity of impedance due to the strip line 35, whereby the frequency band of the radio wave can be broadened and stabilized. The conductor-free portions 43, 44 formed in the third and fourth conductive layers L3, L4 may have sizes larger than the size of the conductor-free portion 42 formed in the second conductive layer L2. In this case, the electrostatic capacity formed between the land 34 and the conductor-free portions 43, 44 of the third and fourth conductive layers L3, L4 is zeroed, and the variation of the electrostatic capacity formed between the land electrode 34 and the conductor-free portion 42 can be minimized, thereby making it possible to further improve the quality of the telephone set 1.

It is to be understood that the present invention is by no means limited to the details of the first embodiment described above, and may be otherwise embodied as described below by way of example by reference to FIGS. 11-18.

Figure 11:
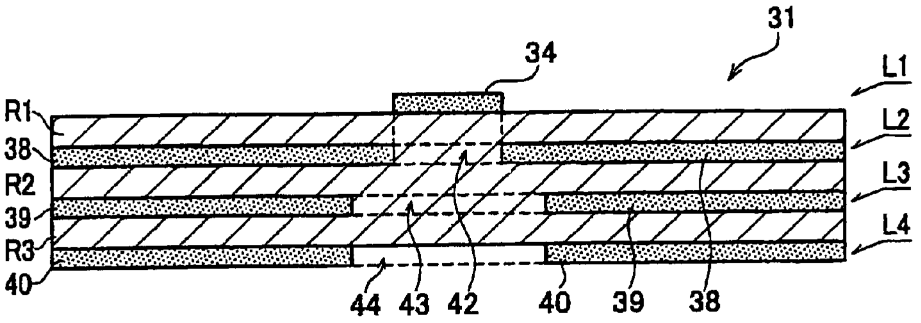
FIG. 11 is a cross sectional view corresponding to that of FIG. 3, showing a second embodiment of this invention wherein a conductor-free portion formed in the conductive layer L3 is larger than that formed in the conductive layer L2.

Referring to FIG. 11, there is shown a multi-layered substrate 31 constructed according to a second embodiment of this invention, wherein the land electrode 34 and the conductor-free portion 42 formed in the second conductive layer L2 have the same diameter as in the first embodiment, but the conductor-free portion 43 formed in the third electrode L3, as well as the conductor-free portion 44 formed in the fourth conductive layer L4 has a diameter larger than that of the land electrode 34 (conductor-free portion 42).

Figure 12:
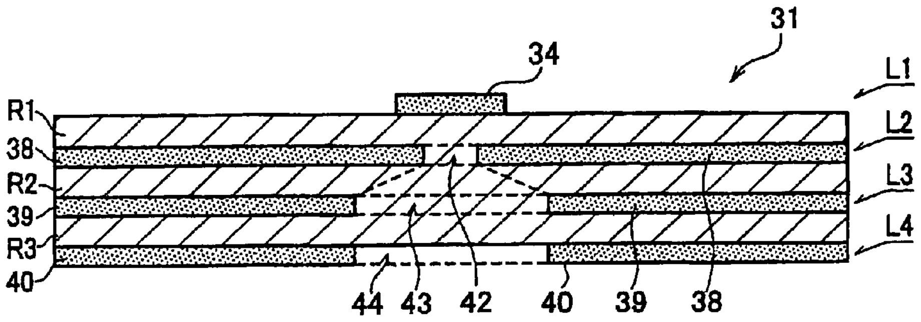
FIG. 12 is a cross sectional view showing a third embodiment of the invention wherein the conductive-free portion of the conductive layer L2 is smaller than the land electrode.
Figure 13:
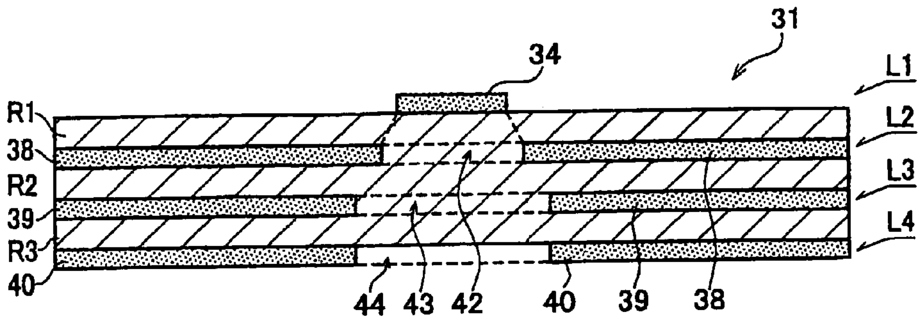
FIG. 13 is a cross sectional view showing a fourth embodiment of the invention, wherein the conductive-free portion of the conductive layer L2 is larger than the land electrode.

Although the conductor-free portion 42 formed in the second conductive layer L2 of the multi-layered substrate 31 has the same diameter as the land electrode 34 in the first and second embodiments described above, the diameter of the conductor-free portion 42 may be made smaller than that of the land electrode 34, as in a third embodiment of the invention illustrated in FIG. 12, or larger than that of the land electrode 34, as in a fourth embodiment of the invention illustrated in FIG. 13.

In the third and fourth embodiments of FIGS. 12 and 13, the diameters of the conductor-free portions 43, 44 formed in the third and fourth conductive layers L3, L4 are made larger than that of the land electrode 34, as in the second embodiment of FIG. 11.

In the third embodiment of FIG. 12 wherein the conductor-free portion 42 of the second conductive layer L2 is smaller than the land electrode 34 of the first conductive layer L1, the electrostatic capacity formed between the land electrode 34 and the conductor-free portion 43 can be made larger than in the case where the conductor-free portion 42 has the same size as the land electrode 34. In the fourth embodiment of FIG. 13 wherein the conductor-free portion 42 is larger than the land electrode 34, the electrostatic capacity formed between the land electrode 34 and the conductor-free portion 43 can be made smaller than in the case where the conductor-free portion 42 has the same size as the land electrode 34.

Accordingly, the two resonance frequency points of the radio wave to be transmitted and received through the planar antenna device 3A can be accurately controlled to stably broaden the frequency band by controlling the size of the conductor-free portion 42 according to a desired pattern used to form the multi-layered substrate 31. Further, the variation of the electrostatic capacity formed between the land electrode 34 and the conductor-free portion 42 can be minimized by zeroing the electrostatic capacity formed between the land electrode 34 and the conductor-free portions 43, 44 of the third and fourth conductive layers L3, L4, whereby the quality of the multi-layered substrate 31 can be further improved.

The radio-frequency telephone set 1 according to the present invention may use a two-conductive-layer substrate 51 as in fifth through eighth embodiments illustrated in FIGS. 14-17. The two-conductive-layer substrate 51 includes a first conductive layer L1, a dielectric layer R5, and a second conductive layer L2, which are arranged such that the dielectric layer R5 is sandwiched between the first and second conductive layers L1, L2. The first conductive layer L1 has the power supply electrode 33, land electrode 34 and strip line 35, while the second conductive layer L2 has the ground electrode 38 and the conductive-free portion 42. In the substrate 51 of FIGS. 14-16, the ground electrode 36 and the conductive-free portion 46 are not formed in the first conductive layer L1. In the substrate 51 of FIG. 17, however, the ground electrode 36 is formed in the first conductive layer L1, so as to define the conductor-free portion 46 around the land electrode 34. In the presence of the conductor-free portion 46 of the first conductive layer L1, the ground electrode 36 does not influence the electrostatic capacity formed between the land electrode 34 and the conductor-free portion 42 of the second conductive layer L2. In FIGS. 14-17, the same reference signs as used in FIG. 3 are used to identify the functionally corresponding elements.

Figure 14:
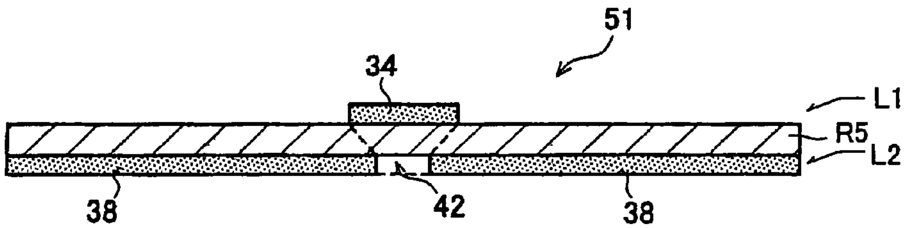
FIG. 14 is a cross sectional view showing an example of a two-conductive-layer substrate used in a fifth embodiment of the invention, wherein the conductive-free portion formed in the conductive layer L2 is smaller than the land electrode of the conductive layer L1.
Figure 15:
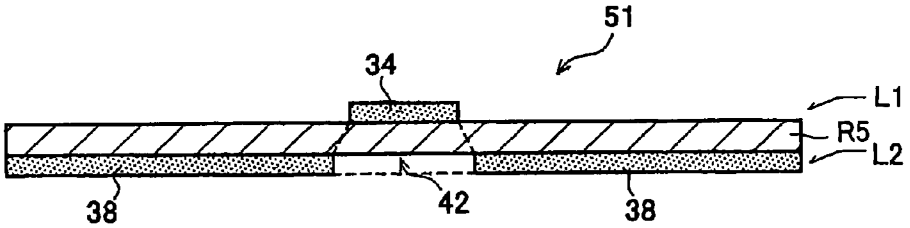
FIG. 15 is a cross sectional view showing an example of a two-conductive-layer substrate used in a sixth embodiment of the invention, wherein the conductive-free portion of the conductive layer L2 is larger than the land electrode of the conductive layer L1.
Figure 16:
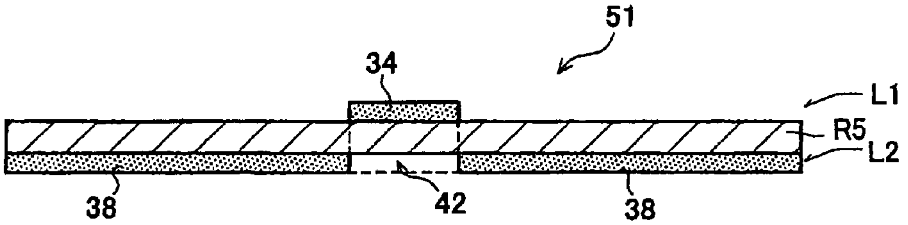
FIG. 16 is a cross sectional view showing an example of a two-conductive-layer substrate used in a seventh embodiment of the invention, wherein the conductive-free portion of the conductive layer L2 has the same size as the land electrode of the conductive layer L1.
Figure 17:
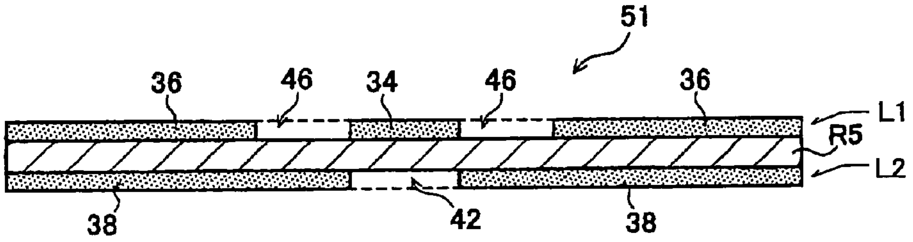
FIG. 17 is a cross sectional view showing an example of a two-conductive-layer substrate used in an eighth embodiment of the invention, wherein the conductive layer L1 has a ground electrode having a conductive-free portion formed around the land electrode.

In the fifth embodiment of FIG. 14, the conductor-free portion 42 of the second conductive layer L2 is smaller than the land electrode 34. In the sixth embodiment of FIG. 15, the conductor-free portion 42 is larger than the land electrode 34. In the seventh embodiment of FIG. 16, the conductor-free portion 42 has the same size as the land electrode 34. In the eighth embodiment of FIG. 17, the conductor-free portion 42 has the same size as the land electrode 34 which is spaced from the ground electrode 36 by the conductor-free portion 46.

While the land electrode 34 and the conductor-free portion 42 have a circular shape, they may have any other shape such as rectangular, and elliptical shapes, as long as the input and output terminal of the RF module 3 can be easily soldered to the land electrode 34. Similarly, the conductor-free portions 43, 44 may have rectangular, elliptical and any other shapes other than a circular shape.

Figure 18:
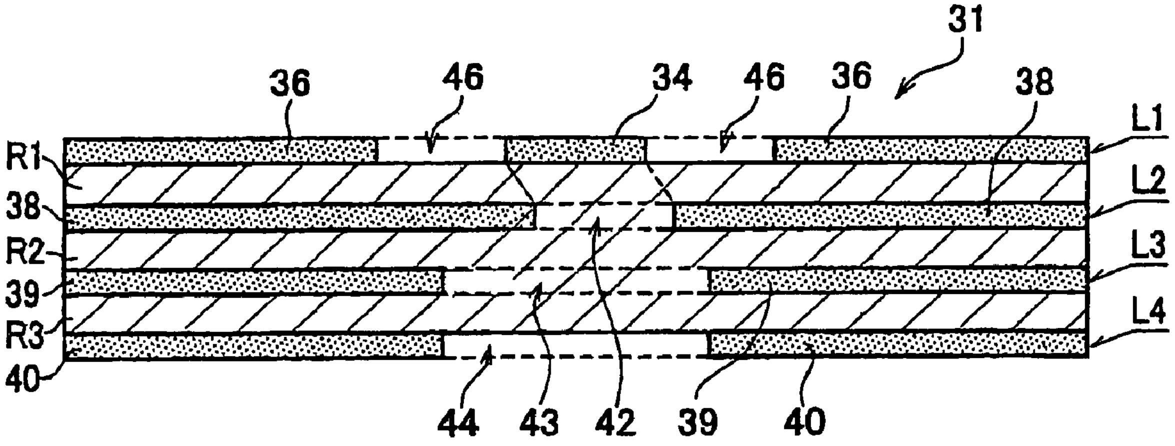
FIG. 18 is a cross sectional view showing a ninth embodiment of the invention, wherein the conductor-free portion of the conductive layer L2 is not aligned with the land electrode of the conductive layer L1 as viewed in the direction perpendicular to the plane of the multi-layered substrate.

While the conductor-free portion 42 of the second conductive layer L2 is aligned with the land electrode 34 of the first conductive layer L1 as viewed in the direction perpendicular to the plane of the dielectric layer R1, R5 in the illustrated embodiments described above, the conductor-free portion 42 may be offset with respect to the land electrode 34 by a suitable distance in the direction parallel to the plane of the dielectric layer R1, as in a ninth embodiment illustrated in FIG. 18, which is different from the embodiment of FIG. 11 in that the conductor-free portion 42 having the same size as the land electrode 34 only partially overlaps the land electrode 34. In this case, too, the frequency band to be transmitted and received by the planar antenna device 3A can be suitably broadened and stabilized.

What is claimed is:

1. A radio-frequency telephone set comprising (a) a powered antenna element having a power supply portion, and (b) a substrate having a dielectric layer, a first conductive layer formed on one of opposite surfaces of the dielectric layer, and a second conductive layer formed on the other of said opposite surfaces, wherein said first conductive layer includes a conductive pattern that has opposite end portions one of which is electrically connected to the power supply portion, and further has a land electrode electrically connected to the other of said opposite end portions, and wherein said second conductive layer includes a ground electrode and a conductor-free portion defined by said ground electrode, the land electrode and the conductor-free portion at least partially overlapping each other as viewed in a direction perpendicular to a plane of said dielectric layer.

2. The radio-frequency telephone set according to claim 1, wherein an entirety of the land electrode overlaps the conductor-free portion as viewed in the direction perpendicular to the plane of the dielectric layer.

3. The radio-frequency telephone set according to claim 2, wherein an entirety of the land electrode and an entirety of the conductor-free portion overlap each other as viewed in the direction perpendicular to the plane of the dielectric layer.

4. The radio-frequency telephone set according to claim 2, wherein the land electrode is larger than the conductor-free portion, and an entirety of the conductor-free portion overlaps the land electrode as viewed in the direction perpendicular to the plane of the dielectric layer.

5. The radio-frequency telephone set according to claim 1, wherein the land electrode has a circular shape.

6. The radio-frequency telephone set according to claim 1, wherein the substrate is a multi-layered substrate including at least two dielectric layers and at least three conductive layers, said at least three conductive layers including said first and second conductive layers, and said at least two dielectric layers including said dielectric layer on which said first and second conductive layers are formed, and wherein said second conductive layer includes said ground electrode as a first ground electrode and said conductor-free portion as a first conductor-free portion.

7. The radio-frequency telephone set according to claim 6, wherein said at least three conductive layers further including at least one additional conductive layer including a third conductive layer located next to said second conductive layer, said at least one additional conductive layer having a second ground electrode and a second conductor-free portion which is defined by said second ground electrode and which is larger than said first conductor-free portion.

8. The radio-frequency telephone set according to claim 7, wherein the entirety of said first conductor-free portion overlaps said second conductor-free portion.

9. The radio-frequency telephone set according to claim 1, wherein the substrate is a multi-layered substrate including at least three dielectric layers and at least four conductive layers, said at least four conductive layers including said first and second conductive layers, and said at least three dielectric layers including said dielectric layer on which said first and second conductive layers are formed, and wherein said second conductive layer includes said ground electrode as a first ground electrode and said conductor-free portion as a first conductor-free portion, said at least four conductive layers further including a third conductive layer located next to said second conductive layer, and a fourth conductive layer located next to said third conductive layer, said third conductive layer having a second ground electrode and a second conductor-free portion defined by said second ground electrode, and said fourth conductive layer having a third ground electrode and a third conductor-free portion defined by said third ground electrode.

10. The radio-frequency telephone set according to claim 9, wherein said first, second and third conductor-free portions have respective first, second and third sizes which are determined such that the first and third sizes are respectively smallest and largest, and such that the second size is not smaller than the first size and is not larger than the third size.

11. The radio-frequency telephone set according to claim 6, wherein said dielectric layer formed between said first and second conductive layers has a thickness of 0.2 mm, and said powered antenna element has a resonance frequency of 5.8 GHz, and said land electrode is a circular electrode having a diameter of 2 mm, and said first conductor-free portion is a circular portion having a diameter of 2 mm.

12. The radio-frequency telephone set according to claim 1, wherein said first conductor layer further includes another ground electrode which cooperates with said conductive pattern to define another conductor-free portion which is sized such that said another ground electrode is spaced from said conductive pattern by a distance of not smaller than 70% of an external dimension of said land electrode.

13. The radio-frequency telephone set according to claim 12, wherein said land electrode has a circular shape, and said external dimension is a diameter of the land electrode.

14. The radio-frequency telephone set according to claim 1, wherein a size of said land electrode, a size of said conductor-free portion, and a relative position between the land electrode and the conductor-free portion are determined such that said powered antenna element has a frequency band broader than an inherent band thereof.

15. The radio-frequency telephone set according to claim 14, wherein the relative position between the land electrode and the conductor-free portion includes at least one of a relative position therebetween determined by a thickness of said dielectric layer and a relative position therebetween in a direction parallel to a plane of the dielectric layer.

16. The radio-frequency telephone set according to claim 1, wherein said powered antenna element is a planar antenna device including a planar top wall portion parallel to a plane of said dielectric layer and a pair of side wall portions extending from opposite ends of said planar top wall portion in a direction perpendicular to the planar top wall portion.

17. The radio-frequency telephone set according to claim 1, further comprising a high-frequency circuit having an input and output terminal to which said land electrode is soldered.

18. The radio-frequency telephone set according to claim 1, wherein the land electrode and the conductive-free portion define therebetween an electrostatic capacitor, and the power supply portion of the powered antenna element is electrically coupled with the ground electrode via the electrostatic capacitor.

* * * * *